Nov. 14, 1933.  H. J. HUBER  1,935,448
ELECTRICAL SWITCHGEAR
Filed June 22, 1932
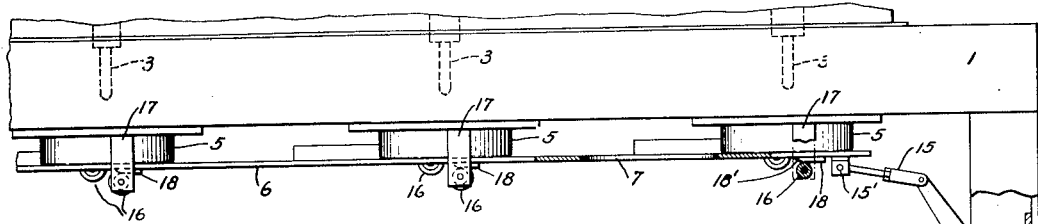
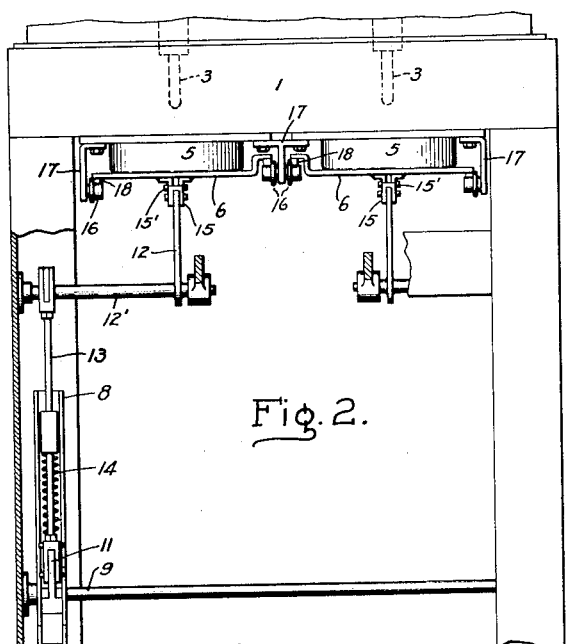
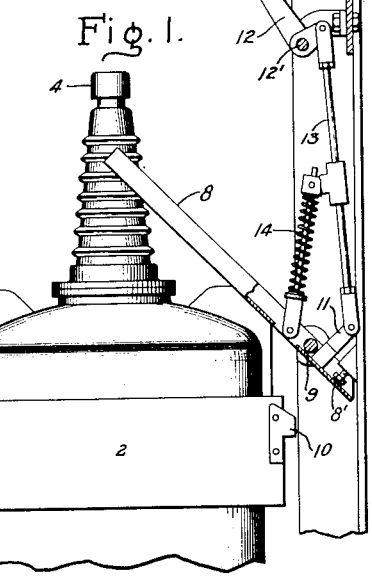
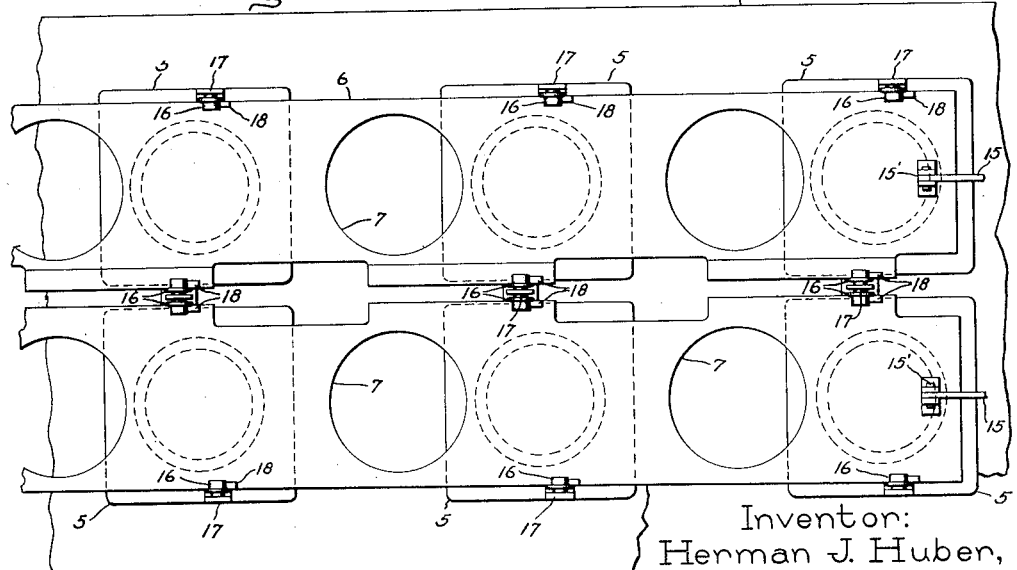
Fig. 1.
Fig. 2.
Fig. 3.
Inventor:
Herman J. Huber,
by Charles E. Mullen
His Attorney.

Patented Nov. 14, 1933

1,935,448

UNITED STATES PATENT OFFICE 1,935,448

ELECTRICAL SWITCHGEAR

Herman J. Huber, Upper Darby, Pa., assignor to General Electric Company, a corporation of New York Application June 22, 1932. Serial No. 618,720

5 Claims. (Cl. 175—298)

My invention relates to electrical switchgear, more particularly to metal clad switchgear of the draw-out type wherein shutters or the like are employed to isolate and cover live conducting parts, as disconnecting contacts connected to bus bars or other live circuits, when the movable switch unit is withdrawn.

The use of movable metallic cover members or shutters for isolating the live stationary disconnecting contacts in switchgear of the aforesaid type is well known practice. In general, particularly in outdoor installations, it is necessary that the shutters fit tightly against the open ends of the casings enclosing the stationary disconnecting contacts so that said contacts are well sealed with respect to the outside atmosphere when the switch unit is in the withdrawn or isolated position. Heretofore this has been accomplished by fitting the shutter very closely with respect to its guides and the open ends of the disconnecting contact casings so that considerable friction is present. A serious objection to this arrangement is that the friction may be so great that binding results during operation of the shutters and the shutters are left in the partially open or closed positions. In case the shutters are loosely fitted so as to operate easily, moisture, gases, etc. may enter the casings seriously reducing the insulation factor.

The principal object of my invention is the provision of an improved shutter arrangement for electrical switchgear of the draw-out type which is effective to seal tightly the live disconnecting contacts in the isolating position of the shutter, is simple and rugged in construction, and which may be easily and positively operated.

My invention will be more fully set forth in the following description referring to the accompanying drawing, and the features of novelty which characterize my invention will be pointed out with particularity in the claims annexed to and forming a part of this specification.

Referring to the drawing, Fig. 1 is an elevational fragmentary view, partly in section, showing metal clad switchgear embodying my invention; Fig. 2 is an end view, partly in section, of structure shown in Fig. 1, and Fig. 3 is a plan view, viewed from below, of the shutter arrangement shown in Figs. 1 and 2.

There is illustrated in Fig. 1 a portion of metal clad switchgear of the draw-out type comprising a stationary structure 1 including suitable supporting framework and a movable switch unit 2 provided with means (not shown) for causing movement to the operative and withdrawn or isolated positions with respect to the stationary structure. The disconnecting contacts, the functions of which in draw-out switchgear are well known, may be of any suitable type as plug and socket and in the present instance comprise the stationary plug contacts 3 mounted in the stationary structure 1 and movable socket contacts 4 mounted at the upper ends of the terminal bushings of the switch unit 2. The stationary disconnecting contacts 3 are individually housed within insulating casings 5 which are formed as cylindrical shells open at the lower ends thereof for receiving the coacting movable disconnecting contacts 4. The switchgear illustrated is designed for three phase circuits, the stationary disconnecting contacts being arranged in three groups of two each as indicated in Figs. 2 and 3, and the movable switch unit comprising three single phase breakers (one of which is shown) mounted so as to move as a unit. As is well known, elevation of the switch unit so as to cause engagement of the coacting disconnecting contacts 3 and 4 permits bus bar circuits and the like to be connected through the switch unit, and when the switch unit is in its withdrawn position, as shown, the individual circuit breakers are completely isolated so that they may be inspected or repaired without danger.

For the purpose of completely isolating the stationary disconnecting contacts 3 and other live conducting parts within the insulating shells 5 a shutter 6 having circular apertures 7 is provided so as to uncover or cover the open ends of said shells in accordance with movement of the switch unit 2. The shutter preferably comprises two plate-like sections of metal, one section for the corresponding terminals of each phase as shown in Figs. 2 and 3. The shutter is mounted and guided for horizontal lengthwise movement and the apertures 7 are located so as to be in registry with the open ends of the insulating shells 5 when the disconnecting contacts are brought into engagement, the shutter itself closing said shells in the isolated position. Any suitable means for actuating the shutter in accordance with the movement of the switch unit may be employed and by way of example a mechanical linkage operatively connecting the switch unit and shutter is shown. The connection comprises a channel shaped lever 8 pivotally mounted on an upright of the stationary frame at 9 and arranged to be engaged by a camming lug 10 carried by the switch unit 2. The lever 8 is provided with an extension 11 which is connected to a bellcrank 12, pivoted to the frame at 12' through an intermediate rod 13, the rod 13 and the lever 8 being interconnected by a compression spring 14 arranged so as to normally bias the lever 8 against its stop member 8'. The bellcrank 12 is connected as by a link 15 to the shutter at 15' so that upon clockwise rotation of the lever 8 by elevation of the camming lug 10, the bellcrank 12 is rotated in corresponding direction and the shutter moved lengthwise so as to place the apertures 7 in alinement with the insulating shells 5, thereby uncovering the stationary disconnecting contacts.

For the purpose of preventing binding of the movable shutter and for adequately sealing the stationary disconnecting contacts in the isolating position of the shutter, means are provided for firmly clamping the shutter against the lower ends of the insulating shells 5 at substantially the end of the isolating operation. This is accomplished by allowing the shutter to move freely and easily during the greater part of its isolating movement and by pressing the same laterally against the open ends of the insulating shells practically at the end of the shutter movement.

To this end the shutter 6 is freely movable along the supporting and guiding rollers 16 supported by lugs 17 fixed to the stationary structure 1, there being an appreciable clearance between the shutter and the insulating shells during the major part of the shutter movement. Accordingly, very little force is required to move the shutter over this range of movement. The means for pressing the shutter into snug sealing engagement with the insulating shells 5 comprise a plurality of wedging members 18 secured to the lower sides of the shutter so as to be in alinement with the rollers 16 and to engage said rollers substantially at the end of the isolating movement of the shutter. As best illustrated in Fig. 1, the wedging members 18 are provided with wedging surfaces 18' so as to cause the same to ride over the rollers 16 resulting in lateral or upward movement of the shutter into firm engagement with the insulating shells. By this arrangement the stationary disconnecting contacts are not only effectively isolated but are protected from moisture and gases which might enter the insulating shells in the event of appreciable clearance between the same and the shutter. The camming members, which are preferably positioned so as to urge the shutter into engagement with the insulating shells at opposite sides of each shell as illustrated in Fig. 3, also serve to retard the isolating movement of the shutter at the point where retardation is most necessary.

When the switch unit is to be elevated to its operative position, the initial movement of the shutter in response to elevation of the switch unit is effective to cause the wedging members 18 to ride off the guiding and supporting rollers so that the remainder of the shutter movement is easily accomplished.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States is:

1. In electrical switchgear of the draw-out type including a movable switch unit arranged to be connected to stationary live conducting parts, a housing partly enclosing said live parts, isolating means for said live parts comprising a shutter, said shutter guided lengthwise for reciprocal rectilinear movement, means actuating said shutter so as to uncover and cover said live parts in accordance with the movement of said switch unit, and means responsive to the covering movement for pressing said shutter laterally towards said housing for sealing said live conducting parts.

2. In electrical switchgear of the draw-out type including a movable switch unit having disconnecting contacts arranged to engage stationary disconnecting contacts, isolating means for said stationary contacts comprising a shutter, means actuating said shutter in accordance with movement of said switch unit so as to uncover and cover said stationary disconnecting contacts, and wedging means operative during the covering movement of said shutter for pressing the same laterally so as to seal said stationary disconnecting contacts.

3. In electrical switchgear of the draw-out type including stationary disconnecting contacts and a movable switch unit having coacting disconnecting contacts, isolating means for said stationary disconnecting contacts comprising a movable shutter, means actuating said shutter in accordance with movement of said switch unit so as to uncover said stationary contacts when the switch unit is in operative position and to cover and isolate said contacts when said unit is withdrawn, and wedging members carried by said shutter arranged so as to press said shutter substantially at the end of said covering movement into a sealing fit with respect to said stationary disconnecting contacts.

4. In electrical switchgear of the draw-out type including a movable switch unit having disconnecting contacts and stationary structure having coacting disconnecting contacts, said stationary disconnecting contacts individually mounted within insulating shells open at one end to receive the coacting movable contacts, isolating and protective means for said stationary disconnecting contacts comprising a shutter guided for reciprocal lengthwise movement, means actuating said shutter in accordance with movement of said switch unit to operative and isolated positions so as to uncover and cover, respectively, the open ends of said shells, and means operative during the final part of said covering movement for wedging said shutter into snug engagement with the ends of said shells isolating the stationary disconnecting contacts.

5. In electrical switchgear of the draw-out type including a movable switch unit having disconnecting contacts and stationary structure enclosing coacting disconnecting contacts, means for isolating said stationary disconnecting contacts when the switch unit is withdrawn comprising a shutter movable to uncovering and covering positions with respect to said stationary contacts in accordance with the position of said switch unit, guiding and supporting means for said shutter including a plurality of rollers, and wedge members carried by said shutter each arranged to engage one of said rollers near the end of the covering movement for pressing said shutter laterally into engagement with said stationary structure, said wedge members serving likewise to retard the covering movement of said shutter.

HERMAN J. HUBER.